United States Patent [19]

Rapp et al.

[11] Patent Number: 4,469,708

[45] Date of Patent: Sep. 4, 1984

[54] EGG PRODUCT AND PROCESS

[75] Inventors: Harold Rapp, Fairfield; William G. Dockendorf, Stamford, both of Conn.

[73] Assignee: Nabisco Brands, Inc., Parsippany, N.J.

[21] Appl. No.: 411,073

[22] Filed: Aug. 24, 1982

[51] Int. Cl.³ .............................................. A23L 1/32
[52] U.S. Cl. .................................. 426/103; 426/293; 426/302; 426/305; 426/330.1; 426/614; 426/658; 426/661
[58] Field of Search ................. 426/614, 274, 89, 103, 426/293, 302, 305, 330.1, 658, 661

[56] References Cited

U.S. PATENT DOCUMENTS

| | | | |
|---|---|---|---|
| 3,434,843 | 3/1969 | Durst | 426/98 |
| 3,510,315 | 5/1970 | Hawley | 426/89 X |
| 3,911,144 | 10/1975 | Strong et al. | 426/614 X |
| 3,914,443 | 10/1975 | Sakita et al. | 426/274 |
| 4,001,449 | 1/1977 | Reardanz et al. | 426/274 X |
| 4,046,922 | 9/1977 | Burkwall, Jr. | 426/614 X |
| 4,282,258 | 8/1981 | Forkner | 426/274 |
| 4,296,134 | 10/1981 | Boldt | 426/614 X |
| 4,421,770 | 12/1983 | Wiker | 426/89 |

OTHER PUBLICATIONS

Woman's Day "Encyclopedia of Cookery", vol. 4, Fawcett Publ., Inc., New York, 1966, p. 518.
The Gourmet Cookbook, Gourmet Distributing Corp., New York, 1950, p. 121.

*Primary Examiner*—Robert Yoncoskie
*Attorney, Agent, or Firm*—Richard Kornutik

[57] ABSTRACT

Disclosed are a freeze-thaw stable egg product and a process for preparing it. The product comprises discrete pieces of egg, bound together and covered with a batter coating. Preferably, the discrete pieces of egg include from about 0.5 to about 4.0% of water-binding carbohydrates including cold-water-insoluble starch and hydrophilic colloids to obtain freeze-thaw stability. The use of cold-water-insoluble starch, and the addition of the hydrophilic colloids in a blend with a vegetable oil, are helpful in obtaining good mixing without excessive shear. The egg mixture is cooked, diced and coated with a binder. Preferably, the binder is added in two portions, one dry and one liquid. The dry portion preferably employs cold-water-soluble gelatin which provides structural integrity during forming but is liquid at serving temperature, thereby adding juiciness and enhancing flavor release. The products are batter dipped and preferably breaded, and are preferably prepared for serving by deep fat frying.

31 Claims, No Drawings

EGG PRODUCT AND PROCESS

BACKGROUND OF THE DISCLOSURE

The present invention relates to eggs, and more particularly, to a new, freeze-thaw stable egg product and to a method for preparing it.

Eggs are extremely nutritious, and have been prepared in countless ways, with various spices and sauces to further enhance their natural appealing taste, aroma and appearance. And, food processors have provided the technology to enable long-term storage stability in a number of new product forms. For example, frozen liquid eggs are now available in paper cartons and can be stored in this condition for extensive periods of time. These products can be frozen, thawed and re-frozen because the uncooked eggs have not yet developed their cooked texture. Also available to the consumer are scrambled egg products, typically packaged as a part of a frozen breakfast.

Current commercial frozen food storage does not always maintain food products at freezing temperatures and in a frozen condition. Very often, during loading and unloading of transportation vehicles, the product will be permitted to partially or even completely thaw. This also happens in grocery stores when cartons of products are awaiting placement in the freezer chamber. Also, malfunctions of freezer equipment and cartons near the upper levels are further causes of thawing. To be acceptable under these commercial realities, a frozen food must not deteriorate noticeably after several cycles of being thawed and then re-frozen. Egg products typically tend to be subject to syneresis following even one cycle of thawing and re-freezing. It is suspected that this is due to the formation of large ice crystals and the creation of voids within the food product. While the product can be simply re-frozen, these voids are further enlarged with each cycle of thawing and re-freezing and result in a cooked product having a spongy texture with the water weeping from the eggs, leaving them sitting in an unappetizing puddle. The water which would normally exude would also tend to render soggy a coating which was intended to be crispy.

For the purposes of the present description, the term freeze-thaw stability shall mean that the product can undergo at least five cycles of thawing completely with a temperature rise to 40° F. and then re-freezing to a temperature of 0° F. with no significant synerisis occurring upon final cooking and no significant textural loss.

Our work in developing a freeze-thaw stable product, initially created processing as well as product quality problems while attaining freeze-thaw stability. When cold-water-soluble starch and hydrophilic colloids are employed in amounts sufficient to bind the water after cooking and during storage to render the product freeze-thaw stable, problems are encountered during initial mixing. These materials create the need for high shear mixing which not only adversely affects the heat setting properties of the eggs, but also results in the incorporation of the air into the product. The incorporation of air has two adverse effects. First, it makes the product undesirably spongy. Secondly, the air pockets form convenient spaces for water to collect and ice crystals to grow, thereby to some extent counteracting the beneficial results of the additives.

The product desired, which led to the findings of the present invention, is not simply scrambled eggs alone, but it comprises discrete pieces of egg bound together and shaped and then covered with a batter coating, which preferably contains bread crumbs to provide a crispy outer texture upon frying. This type of product has been shown to be highly favored in terms of organoleptic attributes, but presented difficulties in achieving sufficient product integrity during its preparation and still retaining a desirable overall taste and texture for the product. It was found initially that products which were bound together by a binder system effective to provide the desired degree of strength for processing, would tend to have poor flavor release and would give a heavy mouthfeel, quite dissimilar from the mouthfeel of home-cooked scrambled eggs which was desired.

SUMMARY OF THE INVENTION

Accordingly, it is an object of the present invention to provide a freeze-thaw stable egg product which internally gives the appearance of scrambled eggs and exteriorly has a batter coating which becomes crisp upon frying.

It is another object of the invention to provide a freeze-thaw stable egg product which has good flavor release and mouthfeel, which internally gives the appearance of scrambled eggs and exteriorly has a batter coating which becomes crisp upon frying.

It is another object of the present invention to provide a batter-coated, freeze-thaw stable egg product wherein loosely-cohered pieces of cooked eggs give an organoleptic response similar to scrambled eggs, but the product is sufficiently strong structurally to endure the rigors of processing.

It is yet another object of the present invention to provide a freeze-thaw stable egg product which interiorly has discrete pieces of egg cohered tightly enough during processing to prevent cracking or crumbling of the product, while not masking the flavor impact of the product, providing a clean, quick getaway in the mouth.

It is yet another object of the present invention to enable the mixing of the ingredients necessary for the preparation of a freeze-thaw stable egg product of the type described without using excessive shear as would adversely affect the heat coagulating properties of the egg or result in the incorporation of large amounts of air into the product.

These and other objects are achieved according to at least the preferred embodiments of the present invention which provides a freeze-thaw stable egg product and a process for preparing it. In its broad aspects, the egg product comprises: discrete pieces comprising egg and an amount of a water-binding carbohydrate effective to impart freeze-thaw stability, a binder in an amount effective to hold the discrete pieces together, and a batter coating.

According to the more preferred aspects of the invention, the water-binding carbohydrates will comprise starch and hydrophilic colloid, and will be present in the discrete pieces of egg in an amount of from about 0.5 to about 4.0% of the weight of the pieces which will preferably have a moisture content of from about 72 to about 80%. Also, according to the more preferred embodiments, the weight ratio of the discrete pieces and the binder will be within the range of from about 3:1 to about 2:1. A particularly preferred embodiment, according to the invention, will employ gelatin as a portion of the binder to achieve excellent strength at the temperatures employed during processing, but which will melt away providing a desirable degree of juiciness and enhancing flavor release from the loosely-cohered discrete pieces of cooked egg which provide a soft internal portion for the product, which gives an organoleptic response similar to that of scrambled eggs.

In its broad aspects, the process according to the invention comprises: cooking an egg mixture comprising egg and water-binding carbohydrates sufficiently to coagulate the albumen content of the egg, the carbohydrates being employed in an amount effective to render the eggs freeze-thaw stable when cooked; subdividing the cooked egg mixture into discrete pieces; coating the discrete pieces with an amount of binder effective to hold the discrete pieces together; shaping the binder-coated discrete pieces into a desired portion; and coating the portion with a batter.

According to one preferred aspect of the invention, the water binding carbohydrates will comprise a cold-water-insoluble starch and hydrophilic colloid. The hydrophilic colloid will preferably be predispersed in a vegetable oil prior to incorporating into liquid egg at a temperature within the range from about 0° to about 10° C. under conditions of shear sufficient to obtain a uniform blend while limiting incorporation of air into the mixture. According to another preferred aspect of the invention, the discrete pieces are cooled subsequent to cooking, and the binder is applied in at least two stages, with a dry portion being added first and a liquid portion being added thereafter. Preferably, the dry portion of the binder will comprise cold-water-soluble gelatin to provide the advantageous properties discussed above.

DETAILED DESCRIPTION OF THE INVENTION

The first stage in the preparation of the egg product according to the invention is to prepare an egg mixture which contains sufficient amounts of water-binding carbohydrates to render the product freeze-thaw stable. The eggs will typically be liquid eggs which can be either fresh shelled or frozen whole eggs. Alternatively, dried eggs can be employed and rehydrated; however, there are taste and textural disadvantages in their use. It is also possible to employ only the white portion of the egg and to provide suitable colors and stabilizers as are necessary to give the appearance of whole egg while eliminating the yolk. In addition to the liquid eggs, and the water-binding carbohydrates, the egg mixture can contain spices or condiments and will preferably contain a phosphorous compound such as monosodium phosphate for the purpose of maintaining the natural orange-yellow color of the egg during storage. The use of phosphorous compounds for retaining color stability is described in U.S. Pat. No. 3,383,221 to Chin et al.

The water-binding carbohydrates will preferably comprise a cold-water-insoluble starch, such as a modified food starch derived from waxy maize. A wide variety of other starches may also be employed, such as corn starch, modified corn starch, arrow root starch, tapioca starch, and combinations of these. It is important to the successful mixing of the egg mixture, that the starch be insoluble in cold water so that it does not elevate the viscosity of the mixture to an extent that requires high shear mixing which would be destructive of the heat coagulation capabilities of the albumen but also which would incorporate excessive air within the mixture.

The hydrophilic colloid will be selected from among those having good water binding characteristics and can be any of those well known for this purpose such as the natural gums, seaweed extracts and methylcellulose derivatives. Particularly preferred hydrophilic colloids are those selected from the group consisting of xanthan gum, locust bean gum, carob gum, guar gum, carrageenan and mixtures of these.

The hydrophilic colloid is preferably added to the egg mixture in a manner which will prevent it from excessively increasing the viscosity of the mixture. This is most preferably accomplished by admixing the hydrophilic colloid with a triglyceride fat such as any of the common vegetable oils, including corn oil, soybean oil, safflower oil, sunflower oil, cottonseed oil, and the like. The water-binding carbohydrates together will comprise from about 0.5 to about 4.0% of the weight of the egg mixture, and therefore the resulting cooked egg. The moisture content of the egg mixture will desirably be from about 72 to about 80%.

In one particular method for preparing and then cooking the egg mixture, whole eggs in a frozen state are defrosted and then transferred to a blender tank. Separate from the blender tank, a first blend of dry ingredients including the cold-water-insoluble starch and monosodium phosphate is prepared and then added to the defrosted eggs in the blender tank. A second blend is also prepared which includes the hydrophilic colloids dispersed in vegetable oil. This second blend is then added to the blender tank and mixed sufficiently to obtain a uniform blend of the ingredients. The blending is conducted at a temperature within the range of from about 0° to about 10° C. under conditions of shear sufficient to obtain a uniform blend while limiting incorporation of air into the mixture. Preferably, the amount of air incorporated will be less than about 10% of the volume of the mixture.

The egg mixture is then cooked in any manner suitable for coagulating the albumen sufficiently to provide a desirably firm texture without any significant surface drying or discoloration. One method which has been found to be acceptable is to pour the egg mixture into plastic bags or sausage casings and then either immerse these in boiling water or place them in a steam oven for a period of time sufficient to provide the desired degree of cooking.

After the egg mixture has been cooked, it is preferably cooled to a temperature within the range of from about 0° to about 10° C. prior to subdividing the cooked egg mixture into discrete pieces. The cooked egg mixture can be subdivided in any manner suitable to provide pieces which, in the final product, give an appearance reminiscent of scrambled eggs. We presently prefer to subdivide the cooked egg mixture into approximately cube-shaped pieces, about 1 cm or less on each side. Obviously, other sizes and shapes can be selected and in fact will naturally occur during the attempt to achieve this particular size for the discrete pieces. A degree of non-homogeneity in the size of the pieces adds to the attractiveness of the product. According to one procedure, the cooked egg mixture is removed from the plastic cooking bags and cut into slices of about 0.8 cm inch thick prior to chopping into pieces having sides of about 0.95 cm.

The discrete pieces are then uniformly coated with binder prior to shaping into the desired portion shape and size. The binder will preferably contain suitable seasonings to provide an added degree of flavor to the product. It is important to the invention that the binder provide adequate structural integrity to the product during further processing such as the breading operation and packaging, but that it should not provide a heavy mouthfeel which will tend to mask the flavors. The binder should, upon preparation for consumption, only loosely hold the pieces together to give an organoleptic response similar to that of scrambled eggs. The binder will also preferably provide a clean, quick get-away in the mouth.

We have found, according to the present invention, that cold-water-soluble gelatin can be effectively employed as a binder to give this desirable set of somewhat conflicting product requirements. The cold-water-soluble gelatin has the ability to dissolve at the low temperatures desired for processing and to set to its maximum gel strength under these conditions, but then will melt upon final cooking to provide a degree of juiciness which enhances flavor release. If desired, an amount of a cold-water-soluble starch can also be employed as a part of the binder; however, it is not preferred to employ starch as the sole binder because of its tendency to provide the heavy mouthfeel and diminished flavor release described above. Thus, according to the preferred embodiments of the invention, the starch will be employed only in combination with gelatin and then in amounts less than those which would be effective as a binder if used as the sole binder material.

It has been determined according to the present invention that the best binding ability of the cold-water-soluble gelatin or gelatin-starch combination can be achieved where the binder is applied in at least two stages, with a dry portion including the gelatin being added first and a liquid portion being added thereafter. Typically, the dry portion will comprise from about 1 to 10% of the weight of the egg mixture, and preferably will be employed at a level of between 2 and 5%. Within this mixture the ratio of gelatin to starch will typically be within the range of from 1:5 to 1:1. According to this technique, the dry portion of the binder is first sprinkled over the discrete egg pieces and mixed sufficiently to uniformly coat the pieces with the dry portion of the binder. Typically, mixing for about one minute or so will be sufficient. Then, a liquid portion of the binder will be added.

The liquid portion will typically include a highly-flavored sauce which can contain beef or chicken stock, hydrolyzed vegetable protein, various spices and condiments, and other flavors, and will also have additional amount of flour which will provide a desirable degree of consistency to the product. In addition to these materials which will all form a homogeneous sauce which is cooked and then cooled to a temperature of within the range of from about 0° to about 10° C. prior to coating, discrete pieces of onions, bacon, sausage, or the like can be added to this liquid portion of the binder. The binder is added in amounts sufficient to uniformly coat the pieces of egg and to hold them together such that they can withstand further processing. Preferably, the binder will be employed at a weight ratio to the discrete pieces of egg within the range of from about 1:2 to about 1:3.

After coating the discrete pieces of egg with an amount of binder effective to hold them together, the binder-coated discrete pieces of egg are shaped into a desired portion size and shape. This can be accomplished manually or with currently available automatic patty forming machinery. The shaping should be conducted at a temperature within the range of from about 0° to about 10° C. to assure the proper degree of set.

After forming the patties, they are dipped in a typical batter as is employed for coating other food products such as chicken or the like prior to deep fat frying. The batter will preferably contain corn flour, modified food starch, hydrophilic colloids and water as well as various spices, seasonings and colorings. The batter can be applied by commercial battering machine, such as those available from Stein, Pemberton or Heat and Control. After the batter has been applied, the surface of the batter coating is then contacted with bread crumbs, preferably bread having a protein content of at least 7%, to provide a layer of breading. The combined batter and breading becomes desirably brown and crisp upon frying, typically by deep fat frying at a temperature of from about 160° to about 180° C. prior to serving. If desired, the product can be pre-fried as part of the food processor's preparation prior to packaging.

The completed patties will then be frozen, such as by cryogenically freezing as is typically conducted in the frozen food industry. The frozen patties will then be packaged, preferably in air-tight bags to retain the moisture.

The following example is presented for the purpose of further illustrating and explaining the present invention and is not to be taken as limiting in any regard. Unless otherwise indicated, all parts and percentages are by weight.

EXAMPLE

A frozen egg product according to the present invention is prepared from the following ingredients:

| Ingredient | Amount (Parts by Weight) |
|---|---|
| Egg Mixture | |
| Frozen Whole eggs | 52.07 |
| Monosodium Phosphate, Anhydrous | 0.24 |
| Modified Waxy Maize Starch | 1.07 |
| Keltrol F Xanthan Gum | 0.06 |
| Carob Gum | 0.04 |
| Carrageenan | 0.01 |
| Corn Oil | 0.16 |
| | 53.65 |
| Binder | |
| Dry Portion | |
| Cold water soluble gelatin | 0.38 |
| Pregelatinized Starch | 0.96 |
| Parsley | 0.03 |
| | 1.37 |
| Liquid Portion | |
| Flour | 3.33 |
| Salt | 1.39 |
| Spices & Flavors | 1.17 |
| Sugar | 0.17 |
| Keltrol F Xanthan Gum | 0.11 |
| Carob Gum | 0.07 |
| Carrageenan | 0.02 |
| Color (1% solution) | 0.01 |
| Water | 6.51 |
| Chicken base | 1.91 |
| Onions | 8.29 |
| | 22.98 |
| Batter & Bread | |
| Batter Mix | 2.68 |
| Water | 3.57 |
| Breading | 9.75 |
| | 16.00 |

As the first stage, an egg mixture is prepared by defrosting whole eggs at 5° C. for 48 hours and transferring the whole eggs to a Tri-blender mixing tank. The monosodium phosphate and starch are pre-blended to form a first blend which is then added to a feed funnel of the mixing tank. The agitator in the mixing tank is then turned on and a butterfly valve is opened permitting the first blend containing the monosodium phosphate and starch to mix with the eggs. Immediately after completion of the addition of the first blend, a second blend which comprises the corn oil and the various hydrophilic colloids which have been uniformly dispersed within the oil is added through the open butterfly valve. The butterfly valve is then closed and mixing is continued for an additional minute. After terminating the mixing, the egg mixture is filled into Brechteen casings which have a capacity of about 6.1 kg per casing. The casings have a diameter of about 12.1 cm. The casings are then placed in a steam oven maintained at 95° C. to achieve an internal temperature within the egg mixture in the casings of 90° C. After cooking, the eggs are transferred to a refrigerator and cooled to a temperature of between 0° and 5° C.

The sauce mix is prepared by adding the liquid ingredients except for the chicken base, and the dry ingredients except for the flour, are added to about 5 parts of the water in an agitated steam kettle. Then, a slurry of the flour and the additional water is added to the kettle followed by the chicken base and the onions. The entire batch is then heated to about 90° C. and held there for about 4 minutes. After completing the cooking of the sauce, it is cooled to a temperature of about 5° C.

The cooled, cooked eggs are cut into slices of about 0.8 cm thick and then diced in an Urschel dicer into approximately 0.95 cm×0.95 cm×0.8 cm pieces. The diced egg is then transferred to a Blonco blender in which the cold-water-soluble gelatin, the pre-gelatinized starch and the parsley are sprinkled over the diced eggs, and the resulting mixture is mixed for one minute. Then, the sauce is added to the mixer and mixing is continued for 5 minutes.

Following mixing, the binder-coated discrete pieces of egg are shaped into patties approximately 78 grams each having diameter of about 8.5 centimeters and a thickness of about 1.25 centimeter.

A batter which comprises a commercial batter formulation based on modified starch and corn flour is prepared and then applied by means of a commercial battering machine. Following battering, the product is then coated with breading. The finished patty weighs approximately 94 grams, wherein the egg and binder portion forms about 78 grams, the batter forms about 6.25 grams and the breading forms about 9.75 grams. These patties are then frozen cryogenically to a temperature of about −18° C. The patties are then packaged in moistureproof plastic bags.

The above description has been for the purpose of teaching the person skilled in the art how to practice the invention. The description is not intended to describe in detail all of the obvious modifications and variations of the invention which will become apparent to the skilled worker upon reading. It is intended, however, to include all such modifications and variations within the scope of the invention which is defined by the following claims.

What is claimed is:

1. An egg product comprising: discrete pieces of freeze-thaw stable cooked egg obtained by cooking an egg mixture, comprising egg and an amount of water-binding carbohydrate effective to impart freeze-thaw stability to the cooked mixture, sufficiently to coagulate the albumen content of the egg and produce a cooked egg giving the appearance of, and producing an organoleptic response similar to, scrambled eggs, and then subdividing said cooked egg; a binder, comprising cold-water soluble gelatin, in an amount effective to hold the discrete pieces of cooked egg together; and a batter coating surrounding said bound discrete pieces, whereby said egg product when cooked provides a product having a crisp batter coating and an interior giving the appearance of, and producing an organoleptic response similar to, scrambled eggs.

2. An egg product according to claim 1 wherein the water-binding carbohydrate comprises starch and hydrophilic colloid.

3. An egg product according to claim 2 wherein the starch comprises a cold-water-insoluble starch.

4. An egg product according to claim 2 wherein the hydrophilic colloid is a member selected from the group consisting of xanthan gum, carrageenan, carob gum, guar gum, and mixtures of these.

5. An egg product according to claim 4 wherein the starch comprises a cold-water-insoluble modified waxy maize starch.

6. An egg product according to claim 1 wherein the binder further comprises starch.

7. An egg product according to claim 6 wherein the starch is a pregelatinized starch.

8. An egg product according to claim 1 wherein the discrete pieces and the binder comprising gelatin are present in a ratio within the range of from about 2:1 to about 3:1.

9. An egg product according to claim 1 wherein the batter coating further comprises bread crumbs.

10. An egg product according to claim 9 wherein the bread crumbs have a protein content of at least 7%.

11. An egg product according to claim 1 wherein the moisture content of the discrete pieces is within the range of from about 72 to about 80%.

12. An egg product according to claim 11 wherein the water-binding carbohydrates comprise from about 0.5 to about 4.0% of the weight of the discrete pieces.

13. An egg product according to claim 12 wherein the discrete pieces and the binder comprising gelatin are present in a ratio within the range of from about 2:1 to about 3:1.

14. An egg product according to claim 13 wherein the water-binding carbohydrates comprise starch and hydrophilic colloid.

15. An egg product according to claim 14 wherein the starch comprises a cold-water-insoluble starch.

16. An egg product according to claim 15 wherein the hydrophilic colloid is a member selected from the group consisting of xanthan gum, carob gum, carrageenan, guar gum, and mixtures of these.

17. An egg product according to claim 15 wherein the starch comprises a cold-water-insoluble modified waxy maize starch.

18. An egg product according to claim 13 wherein the binder further comprises pregelatinized starch.

19. A process for preparing an egg product comprising:
cooking an egg mixture comprising egg and water-binding carbohydrates sufficiently to coagulate the albumen content of the egg and produce a cooked egg giving the appearance of, and producing an organoleptic response similar to, scrambled eggs, the carbohydrates being employed in an amount effective to render the cooked egg mixture freeze-thaw stable;
subdividing the cooked egg mixture into discrete pieces;

coating the discrete pieces with an amount of binder, comprising cold-water soluble gelatin, effective to hold the discrete pieces together;

shaping the binder-coated discrete pieces into a desired portion; and coating the portion with a batter, whereby said egg product when cooked provides a product having a crisp batter coating and an interior giving the appearance of, and producing an organoleptic response similar to, scrambled eggs.

20. A process according to claim 19 wherein the binder comprising gelatin is applied in at least two stages, with a dry binder portion being added first and a liquid binder portion being added thereafter.

21. A process according to claim 20 wherein the dry portion of the binder further comprises pregelatinized starch.

22. A process according to claim 20 wherein the discrete pieces are cooled to a temperature within the range of from about 0° to about 10° C. prior to coating with the binder.

23. A process according to claim 19 wherein said water-binding carbohydrates comprise a cold-water-insoluble starch and a hydrophilic colloid, and wherein the egg mixture is prepared by the steps of: preparing a first blend of dry ingredients including said cold-water-insoluble starch, preparing a second blend comprising a triglyceride fat and said hydrophilic colloid, and then mixing the first and second blends with liquid egg at a temperature within the range of from about 0° to about 10° C. under conditions of shear sufficient to obtain a uniform blend while limiting incorporation of air into the mixture.

24. A process according to claim 23 wherein less than 10% by volume of air is incorporated during mixing.

25. A process according to claim 23 wherein the weight ratio of discrete pieces to binder is within the range of from about 2:1 to about 3:1.

26. A process according to claim 23 wherein the water binding carbohydrates comprise from about 0.5 to about 4.0% of the weight of the discrete pieces.

27. A process according to claim 26 wherein the moisture content of the discrete pieces is within the range of from about 72 to about 80%.

28. A process according to claim 27 wherein the binder comprising gelatin is applied in at least two stages, with a dry binder portion being added first and a liquid binder portion being added thereafter.

29. A process according to claim 28 wherein the dry portion of the binder further comprises pregelatinized starch.

30. A process according to claim 28 wherein the discrete pieces are cooled to a temperature of from about 0° to about 10° C. prior to coating with the binder.

31. A process according to either of claims 19 or 30 which includes the additional step of contacting the surface of the batter with bread crumbs to adhere them thereto.

* * * * *